INVENTOR.
JONATHAN R. KEIM
BY
John Shaw Stevenson
AGENT.

INVENTOR.
JONATHAN R. KEIM

INVENTOR.
JONATHAN R. KEIM

United States Patent Office 3,449,578
Patented June 10, 1969

3,449,578
TURBIDIMETER USING PHOTOELECTRIC LINEARIZING CIRCUIT INCLUDING SWITCHING CIRCUIT TO INSERT PRESELECTED RESISTANCES
Jonathan R. Keim, Narberth, Pa., assignor to Honeywell Inc., Minneapolis, Minn., a corporation of Delaware
Filed Apr. 12, 1966, Ser. No. 542,004
Int. Cl. H01j 39/12; G01n 21/26
U.S. Cl. 250—209                                    1 Claim

ABSTRACT OF THE DISCLOSURE

A reflection turbidimeter in which the non-linearity of response of the photovoltaic cell is compensated by a voltage dividing circuit including a photoresistive cell and a potentiometer. Temperature compensation is provided by a thermistor. To make the turbidimeter more adaptable a switching circuit is included which can switch various preselected resistances either in parallel with the photoresistive cell or in parallel with the potentiometer.

It is an object of the present invention to disclose a unitary turbidimeter to measure accurately the turbidity in any one of a number of fluids that possesses different turbid characteristics.

It is another object of the present invention to disclose a turbidimeter of the aforementioned type that is constructed to provide a continuous linear measurement in standard Jackson Candle turbidity units of a turbid stream of fluid such as river water.

Turbid conditions of fluids such as those found in flowing streams of river water vary over many wide and narrow ranges under different stream conditions, e.g. when it rains it has a tendency to cause the flow of surface water to carry small particles of the earth into the stream and make the stream very muddy or turbid. When this condition or other similar disturbances of this type occur the stream is thus ofttimes filled with many non-uniform size particles.

When turbidimeters have heretofore been used with recorders to measure these particles of non-uniform size, it has been necessary to record the turbidity data on non-linear chart scales because of the natural non-linear response which this kind of measurement introduces into this turbidity measurement.

It is thus another object of the present invention to disclose a single turbidimeter having a plurality of different characterized circuits which will enable the natural non-linear response of the aforementioned turbidimeter to be linearized.

A better understanding of the present invention may be had from the following detailed description when read in connection with the accompanying drawing in which.

Figure 1:
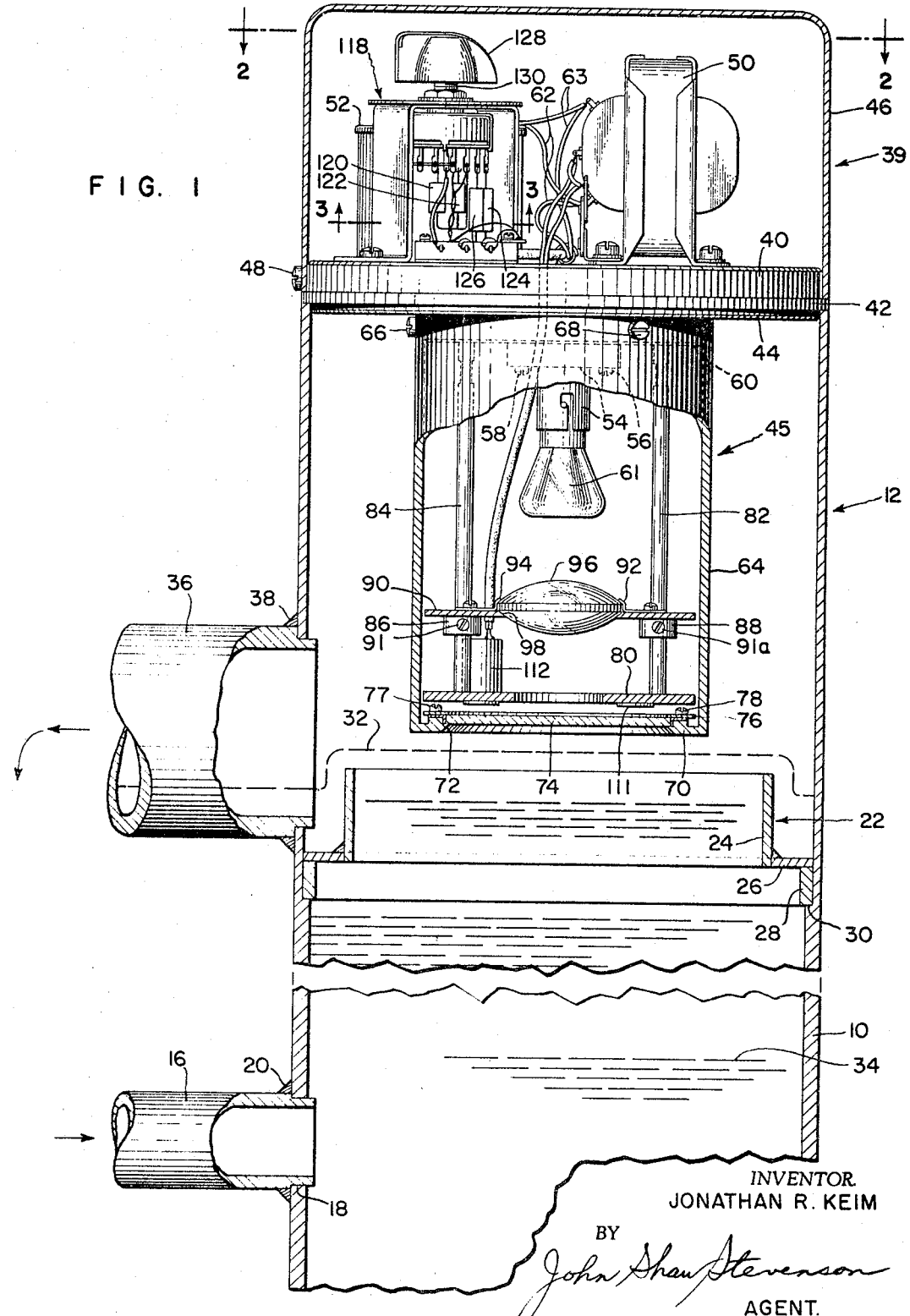
FIGURE 1 is a partial side elevation view of the fluid sampling tank, and the turbidimeter associated therewith.

The wall 10 of the tank 12 has a non-reflective, algae-resistant black coating covering its inner side wall surface and has a fluid-tight inlet passageway that is comprised of a conduit 16. The conduit 16 is shown passing through wall surface 18, forming an aperture in a side wall 10 of a tank 12, and is soldered in a fluid-tight manner at 20 to the outer circumferential surface of the side wall 10.

The upper end of the tank 10 is provided with a spillway plate 22 that is comprised of an integral, vertical, ring-shaped portion 24 and a flat, ring-shaped, base portion 26 that, in turn, is supported by a ring-shaped plate 28. The ring-shaped plate 28 is mounted on an annular recess 30 formed in the inner wall surface 10 of the tank 12.

The upper part of the ring-shaped portion 24 is in a horizontal plane that is immediately below the fixed, upper level surface 32 of the fluid 34 that is retained within the side wall 10 of the tank 12. FIGURE 1 also shows an overflow drain conduit 36 connected to the outer surface of the tank wall 10 by way of a soldered, fluid-tight joint 38.

The removable turbidity-sensing unit 39 is comprised of a support member 40 containing an outer, cylindrical rib portion 42 thereon. The bottom surface of this rib portion 42 and the cylindrical portion 44 are shown supporting the sensing unit 45 in a rotatable position on the top end of the tank wall 12.

The lower end of a wall forming a cup-shaped housing 46 is seated on the top surface of the rib 42 and is retained in place on the support member 40 by means of suitable screw connection 48.

FIGURE 1 schematically shows a conventional, voltage regulating transformer 50 and a condenser 52 mounted on the top surface of the support member 40.

A bayonet light socket unit 54 is mounted by means of screw connections 56, 58 on the lower surface of a cylindrical, embossed portion 60 of the support member 40.

An electrical radiant energy source such as a light bulb 61 is mounted in the socket member 54. The electrical light bulb 61 is electrically connected with the voltage regulating transformer 50 and its associated condenser unit 52 by the interconnection lead wires 62 and 63, which pass through holes in the support member 40. This transformer 50 and condenser unit 51 are thus electrically connected to enable the light being emitted from the light bulb 61 to be maintained at a constant value.

The upper end of a sleeve 64 is shown fixedly connected at its top end to an outer cylindrical surface of the embossed portion 60 by means of a suitable screw connection 66, 68.

The lower end of the sleeve 64 has an annular lip 70 that is made integral therewith and which forms an inner, peripheral surface of the sleeve 64. The lip 70 is shown terminating in a beveled wall surface 72 that provides a light-emitting aperture at the lower end of the sleeve 64.

A transparent protecting plate such as a soda-lime window glass 74 is shown extending across the light-emitting aperture and as being supported on the top, inner surface of the lip 70.

A glass retaining ring 76 is fixedly mounted by means of a suitable number of spaced-apart screw and washer connections 77, 78 on the lip 70.

A disc 80 made of an insulating material such as a plastic material is supported in the spaced-apart position shown above the glass window 74 by means of a suitable number of spaced-apart tie bolts 82, 84 whose upper ends are threadedly connected to the previously-referred-to support member 40.

The sleeves 86, 88 that are integral with the circular ring plate 90 are mounted in a slidably adjusted, preselected, fixed position on the tie bolts 82, 84 by means of the set screws 91, 91a.

A suitable number of spaced-apart, screw-retaining spring clips 92, 94 are shown applying a spring force in a downward direction to retain the spherical lens 96 in a fixed position against the inner curved surface 98 of the ring plate 90.

All of the previously-referred-to parts which surround the light bulb 61 and spherical lens 96 are made of either a metallic material covered with a coating such as black oxide or an equivalent black colored plastic having similar non-reflecting light properties.

Figure 4:
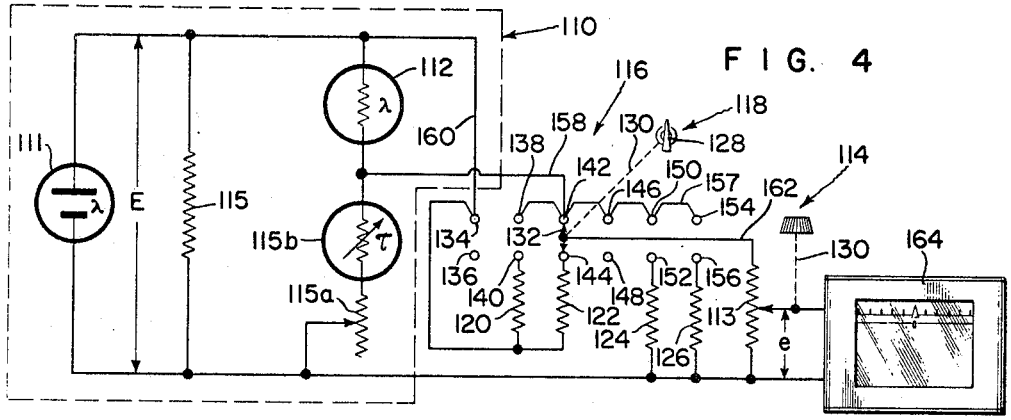
FIGURE 4 is a view showing a multi-range linearizing switching circuit.

FIGURE 4 shows a circuit 110 for producing a linear signal representing the turbidity of the fluid 34 shown in FIGURE 1. This circuit 110 is particularly useful in producing a voltage signal for liquids that possess turbidity characteristics that extend through wide ranges of the aforementioned Jackson Candle Scale.

The light from the light source 61 is focused by lens 96 through the top surface 32 of the fluid 34 into contact with the submerged suspended materials contained therein. The portion of the aforementioned circuit that is used to sense the back scattered light from the suspended material in the fluid is comprised of a photovoltaic cell 111 and photoresistive cell 112 which are fixedly mounted on the plate 80. The output of the photovoltaic cell 111 is a millivoltage E and is shown in FIGURE 4 applied to a voltage divider which is comprised of the resistance introduced by photoresistive cell 112 and the resistance 113 of the manually-adjusted potentiometer 114. FIGURE 4 also shows a load resistor 115, a rheostat 115a, and a temperature compensating thermistor 115b.

The manual adjustment of the potentiometer 114 provides a means for varying the level of the corrected linearized output signal. The resistance introduced into the circuit by the photoresistive cell 112 will be inversely proportional to the back scattered light it receives from the aforementioned suspended materials in the fluid 34. Thus, as the reflected light from flowing turbid fluid 34 is increased, the output of the photovoltaic cell 111 will also be increased and the resistance of the photoresistive cell 112 will be decreased. It can thus be seen from the aforementioned description that the output voltage $e$ which is a portion of the input voltage E will be simultaneously increased as the magnitude of the voltage E is increased.

When a fluid contains a suspended material such as fuller's earth or other similar material in suspension, its turbid characteristics can be readily obtained in linear Jackson Candle Units by employing a light-emitting means to pass light into a fluid and by employing a single conventional photocell to measure the light reflected therefrom. If the same light sensing means were used to sense the turbidity of any one of a number of different types of river water, a linear measurement of the aforementioned type could not be obtained, because of the non-homogeneity of the light scattering, suspended material contained therein. This problem is solved by employing the aforementioned photovoltaic cell 111 and photoresistive cell 112 together with a load resistance 113 connected in parallel with the photovoltaic cell 111 as shown in FIGURE 4. With this circuit arrangement, the output voltage of the photovoltaic cell 111 will be varied directly with its load resistance. This result is brought about because the voltaic cells are basically current output cells.

In the operation of the aforementioned apparatus it can be seen that the tank 10 is constructed so that the fluid 34 whose turbid fluid content is to be measured is pumped under pressure from a fluid source, not shown, through the side wall 12 by way of the inlet conduit 16 into the tank 10 in the direction indicated by the arrow.

The construction is such that the fluid 34 flows into the tank 10 at a higher rate than the rate at which it is drained through the passageways and a second drain not shown which may be located at the bottom of the tank 10. When the level of the fluid in the tank 10 reaches the upper surface 32 it will then flow in a very smooth manner over the sides of the spillplate 24 as shown in FIGURE 1 and thence through the top drain 36.

It can thus be seen from the aforementioned description that this construction allows the upper level 32 of the fluid 34 to always remain flat and at a fixed level because of the large upper edge surface of the spillplate 24 over which the rising water in the tank 10 is allowed to flow. The large lower horizontal level area into which the fluid 34 is thereafter allowed to be dispensed before it flows in a downward direction through this drain 36 in the direction of the arrows is another useful part of the tank construction that will carry the fluid 34 from the tank 10 into the drain pipe at a desired rate so that the upper level 32 of the fluid 34 can be maintained by the spillplate at a fixed height.

The employment of a photovoltaic cell whose voltage increases in a non-linear manner with the light reflected from a fluid whose turbidity is to be measured has been disclosed in the Jonathan R. Keim et al. patent application Ser. No. 310,259, now Patent No. 3,281,602, issued October 25, 1966. The circuit disclosed in that application also advantageously employs a photoresistive cell as a part of a voltage-dividing portion of the circuit to modify the resistance therein in a manner that is inversely proportional to the light reflected from the fluid so that a linear millivolt output signal can be produced by the circuit which is linear with the Jackson Candle Unit Scale.

The aforementioned described tank having a centrally located fluid inlet and a constant fluid leveling top spillplate drain and a funnel-shaped bottom drain, not shown, to enable a constant columnar length of fluid to be available for measurement by a turbidity sensing unit disclosed herein is substantially the same as that disclosed in the aforementioned Jonathan R. Keim et al. patent application Ser. No. 310,259.

It is the purpose of the present disclosure to reveal a unique multi-switching circuit 116 for use with the turbidimeter circuit 110 so that many different non-uniform arrays of particles that form different characteristic patterns of different streams of water can be recorded in linear Jackson Candle Units.

More particularly the multi-switching circuit 116 is comprised of a rotatable two circuit, six position switch 118 and four resistances 120, 122, 124, 126.

Figure 2:
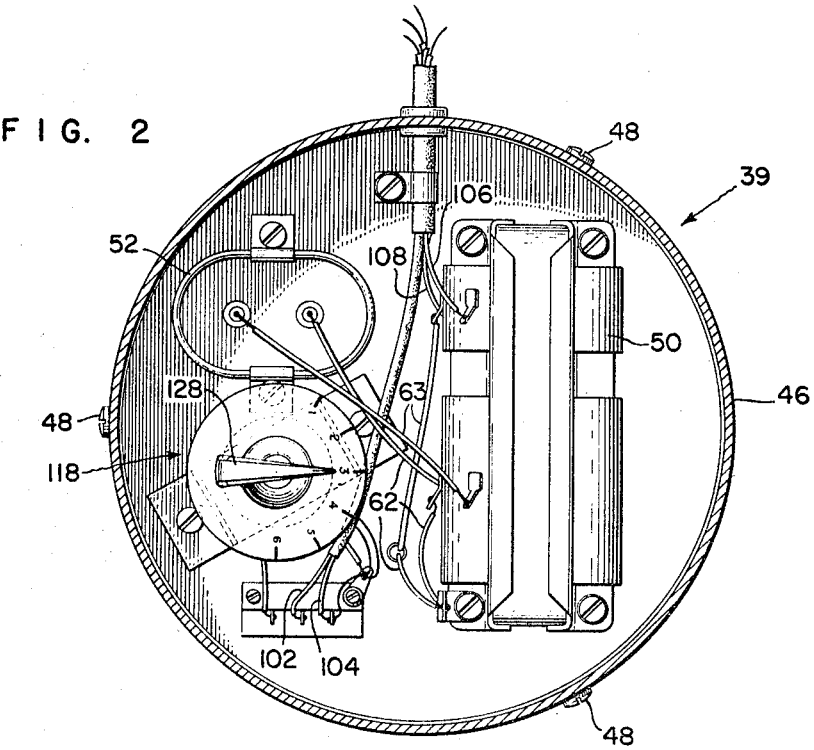
FIGURE 2 is a view of the multi-range turbidimeter taken along line 2—2 of FIGURE 1.

As is best seen in FIGURE 1, the switch 118 which is comprised of a manually rotatable knob 128, as shown in FIGURE 2, can be rotated between any one of a number of positions such as the positions one to six shown in this figure.

Figure 3:
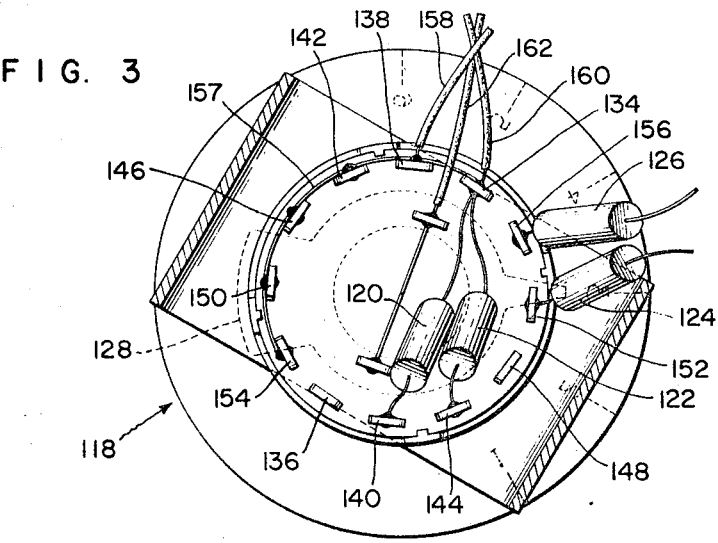
FIGURE 3 is a view of the multi-range turbidimeter taken along line 3—3 of FIGURE 1.

The switch 118 is connected by way of a mechanical connection 130 to a dual wiper unit 132 for movable contact between each pair of terminals 134, 136; 138, 140; 142, 144; 146, 148; 150, 152 and 154, 156 shown in FIGURES 3 and 4 as its knob 128 is rotatably stepped between the first, second, third, fourth, fifth, and sixth positions shown in FIGURE 2. FIGURES 3 and 4 further show a buss bar 157 retaining the aforementioned terminal contact points 135, 138, 142, 146, 150, 154.

FIGURE 4 of the drawing shows the switch handle 128 in its number three position and the double wiper unit 132 electrically connecting the terminal contacts 142, 144 so that a resistance 122 is cut in by way of leads 158, 160, 162 with the circuit 110. Under this condition the resistance 122 will be in parallel with the photoresistive cell 112 and this will have a shunting effect on the output of the cell 112 and thus reduce the electrical output characteristic of the circuit 110 being transmitted to the recorder 164 for directly recording turbidity of the fluid 34 on a recorder 164 in corrected linear Jackson Candle power output voltage form.

The recorder 164 is a well-known, self-balancing null type recording potentiometer such as that which is disclosed in the Walter P. Wills Patent 2,423,540, filed Dec. 1, 1941, issued July 8, 1947.

When the switch handle 128 is moved to its number two position and the wiper unit 132 electrically connects the terminal contacts 138, 140 so that the resistance 120, whose ohm resistance value is less than the resistor value of the resistance 122, is cut in by way of leads 158, 160, 162 with the circuit 110, a smaller resistance than the resistance 122 will then be brought into parallel with the photoresistive cell 112. This action will shunt the output of the cell 112 and reduce the electrical output characteristics of the circuit to a greater degree than was possible when the switch is in its number one position.

When the switch handle 128 is moved to its number four, or an intermediate position none of the resistances 120, 122, 124, 126 will be connected with the circuit 110.

When the switch handle 128 is moved to its number five position more corrective resistance will be applied than under the condition in which the handle 128 was in when it was in the second, third, and fourth position because of the way in which the resistance applies a shunting action to the output potentiometer 114.

When the switch handle 128 is moved to its number six position a greater amount of corrective action will be applied than under the condition that existed when the handle was in any of the preceding due to the difference in each of the magnitudes of the resistance 120-126.

Figure 5:
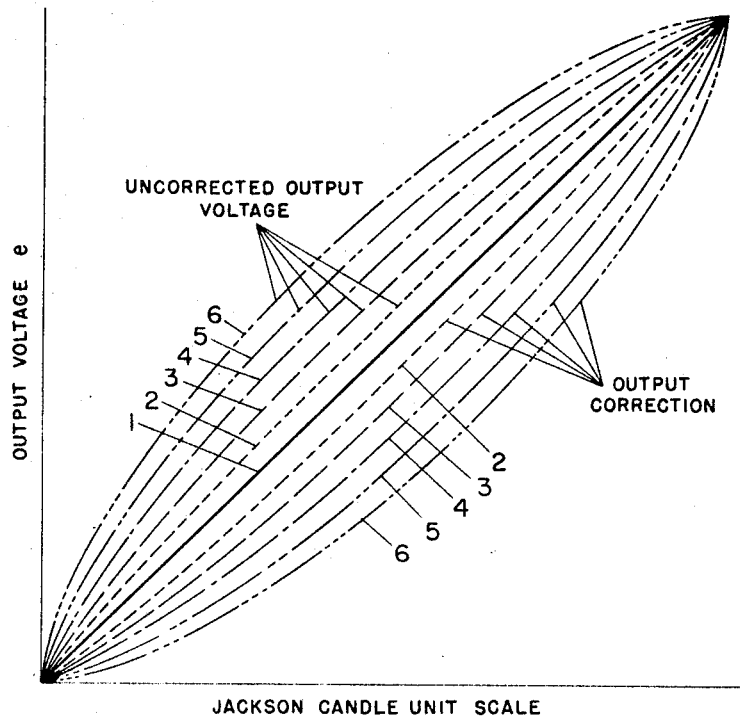
FIGURE 5 is a graph showing how the circuit of FIGURE 4 uniquely corrects for undesired non-linear response that occurs during each different range of turbidity measurement in order to linearize that response in terms of standard Jackson Candle units.

FIGURE 5 shows a diagonal line identified by numeral one which needs no correction of its output voltage because it is linear. This illustrates the type of output voltage that will be obtained with the previously described switching circuit when its knob 128 is placed in the number one position of the switch 118 that is shown in FIGURE 2.

The curved lines above the diagonal represent the natural nonlinear uncorrected output voltage response that is obtained when turbidity measurements are made of different arrays of non-uniform size particles that are taken, e.g. from different turbid streams of water.

All of the curved lines 2, 3, 4, 5, 6 shown below the diagonal line marked one represent the characteristic non-linear voltage effect that is required to be produced by the circuit of FIGURE 4 in order to eliminate each of the aforementioned natural non-linear uncorrected output voltages identified by these same numbers above the diagonal line when the control switch knob 128 has been moved to any one of these selected numbers.

From the aforementioned description, it can be seen that a single turbidimeter has been disclosed that has a plurality of different non-linear characterized circuits to which the turbidimeter can be switched to enable different natural non-linear uncorrected output voltage response characteristics of the turbidimeter to be linearized.

What is claimed is:
1. A linearizing voltage dividing circuit for transforming radiant energy emitted from different selected arrays of non-uniform size particles in different turbid fluid into electrical output signals that are linear with respect to the Jackson Candle Unit Scale of each of the fluids, comprising an electrical switching means connected with and forming a part of the circuit, a first radiant energy responsive means to produce a voltage in the circuit that changes in a non-linear manner with changes in the turbidity of any one of the different array of fluids, a second radiant energy responsive means in the circuit to alter the resistance in the circuit in an inverse manner with respect to the reflected radiant energy emitted from any one of the array of fluids, the second radiant energy responsive means being operably connected to a load resistance, a plurality of resistors possessing different pre-selected resistances, each resistance being operably connected to be individually switched by the switching means into the circuit with the second radiant energy responsive means to provide a means of linearizing the electrical output signal and wherein selected ones of the said plurality of resistors are switched by said switching means into parallel circuit engagement with said second radiant energy responsive means to produce a shunting effect on the second radiant energy responsive means, and wherein other selected ones of said plurality of resistors are switched into parallel circuit engagement with said load resistor to increase the nonlinear compensating effect of the second radiant energy responsive means.

References Cited

UNITED STATES PATENTS 3,281,602  10/1966  Keim et al. _____ 250—206

OTHER REFERENCES

Stout, M. B., Basic Electrical Measurements, 2nd edition, Prentice-Hall Inc., Englewood Cliffs, N.J., 1960, pp. 222–223 and 354–355 relied upon.

RALPH G. NILSON *Primary Examiner.*

M. A. LEAVITT, *Assistant Examiner.*

U.S. Cl. X.R.

250—206, 214, 218; 356—208